United States Patent
Su et al.

(10) Patent No.: US 8,139,907 B2
(45) Date of Patent: Mar. 20, 2012

(54) OPTOELECTRONIC DEVICE AND METHOD OF FORMING THE SAME

(75) Inventors: Tzung-I Su, Yunlin County (TW);
Ming-I Wang, Taipei County (TW);
Bang-Chiang Lan, Taipei (TW);
Te-Kan Liao, Hsinchu (TW); Chao-An Su, Kaohsiung County (TW);
Chien-Hsin Huang, Taichung (TW);
Hui-Min Wu, Hsinchu County (TW);
Tzung-Han Tan, Taipei (TW); Min Chen, Taipei County (TW); Meng-Jia Lin, Changhua County (TW)

(73) Assignee: United Microelectronics Corp., Hsinchu (TW)

( * ) Notice: Subject to any disclaimer, the term of this patent is extended or adjusted under 35 U.S.C. 154(b) by 249 days.

(21) Appl. No.: 12/648,861

(22) Filed: Dec. 29, 2009

(65) Prior Publication Data
US 2011/0158581 A1    Jun. 30, 2011

(51) Int. Cl.
*G02B 6/12* (2006.01)
(52) U.S. Cl. .......................................... 385/14
(58) Field of Classification Search .................. None
See application file for complete search history.

(56) References Cited

U.S. PATENT DOCUMENTS

| | | | |
|---|---|---|---|
| 6,177,297 B1 * | 1/2001 | Chen et al. | 438/132 |
| 6,288,436 B1 * | 9/2001 | Narayan et al. | 257/529 |
| 6,835,642 B2 * | 12/2004 | Yang et al. | 438/601 |
| 7,440,660 B1 * | 10/2008 | Jin et al. | 385/43 |
| 7,454,102 B2 | 11/2008 | Keyser et al. | |
| 7,526,170 B2 | 4/2009 | Kishima | |
| 7,646,943 B1 * | 1/2010 | Wober | 385/12 |
| 7,821,038 B2 * | 10/2010 | Ko et al. | 257/207 |
| 2008/0116537 A1 * | 5/2008 | Adkisson et al. | 257/448 |
| 2008/0217667 A1 * | 9/2008 | Wang | 257/292 |
| 2011/0158581 A1 * | 6/2011 | Su et al. | 385/14 |

* cited by examiner

*Primary Examiner* — Tina Wong
(74) *Attorney, Agent, or Firm* — WPAT, PC; Justin King (57) ABSTRACT

An optoelectronic device including a substrate, a half-boat-shaped material layer, a deep trench isolation structure, and an optical waveguide is provided. The substrate has a first area. The half-boat-shaped material layer is disposed in the substrate within the first area. The refractive index of the half-boat-shaped material layer is lower than that of the substrate. A top surface of the half-boat-shaped material layer is coplanar with the surface of the substrate. The deep trench isolation structure is disposed in the substrate within the first area and located at one side of a bow portion of the half-boat-shaped material layer. The optical waveguide is disposed on the substrate within the first area. The optical waveguide overlaps a portion of the deep trench isolation structure and at least a portion of the half-boat-shaped material layer.

22 Claims, 12 Drawing Sheets

OPTOELECTRONIC DEVICE AND METHOD OF FORMING THE SAME

BACKGROUND OF THE INVENTION

1. Field of the Invention

The present invention generally relates to a semiconductor device and a method of forming the same, and more particularly, to an optoelectronic device and a method of forming the same.

2. Description of Related Art

An optoelectronic device includes both optical devices and electronic devices, wherein the optical devices include a coupler for receiving an optical signal from an optical fiber and an optical waveguide for receiving and transmitting the optical signal, and the electronic devices include a metal-oxide-semiconductor (MOS) device for controlling the optical waveguide. The MOS device controls the optical waveguide to transform the optical signal into an electronic signal so that the optical signal can be used by other electronic devices.

Conventionally, the electronic devices (for example, the MOS device) are formed on a chip while the optical devices (for example, the coupler and the optical waveguide) are formed on another chip, and the devices are then connected with each other through conductive lines. However, an optoelectronic device fabricated through such a technique takes up too much surface area and has a complicated system. Accordingly, how to form the MOS device, the coupler, and the optical waveguide in a single chip has become highly focused in the industry.

Presently, the technique of forming an optical waveguide on a silicon-on-insulator (SOI) substrate has become very mature. However, if a MOS device is also formed on the SOI substrate, the modeling of the MOS device should be fine tuned again, which is time- and labour-consuming and not economical. Thereby, a method of forming an optical waveguide and a MOS device on a bulk-Si substrate is to be developed.

SUMMARY OF THE INVENTION

Accordingly, the present invention is directed to an optoelectronic device, wherein an optical waveguide, a coupler, and a metal-oxide-semiconductor (MOS) device are effectively integrated into a single chip.

The present invention is directed to a method of forming an optoelectronic device, wherein an optical waveguide, a coupler, and a MOS device are formed on a bulk-Si substrate through the existing processes.

The present invention provides an optoelectronic device including a substrate, a half-boat-shaped material layer, a deep trench isolation structure, and an optical waveguide. The substrate has a first area. The half-boat-shaped material layer is disposed in the substrate within the first area. The refractive index of the half-boat-shaped material layer is lower than that of the substrate. A top surface of the half-boat-shaped material layer is coplanar with the surface of the substrate. The deep trench isolation structure is disposed in the substrate within the first area and located at one side of a bow portion of the half-boat-shaped material layer. The optical waveguide is disposed on the substrate within the first area. The optical waveguide overlaps a portion of the deep trench isolation structure and at least a portion of the half-boat-shaped material layer.

According to an embodiment of the present invention, the substrate includes a bulk-Si substrate.

According to an embodiment of the present invention, the material of the half-boat-shaped material layer includes $SiO_x$.

According to an embodiment of the present invention, the material of the optical waveguide includes polysilicon, amorphous silicon, or single crystal silicon.

According to an embodiment of the present invention, the depth of the deep trench isolation structure is in micron level.

According to an embodiment of the present invention, the deep trench isolation structure and the half-boat-shaped material layer are kept a distance apart or directly adjacent to each other.

According to an embodiment of the present invention, a laser is coupled to a stern portion of the half-boat-shaped material layer through an optical fiber.

According to an embodiment of the present invention, the substrate further includes a second area, and the first area and the second area are separated from each other by a shallow trench isolation structure.

According to an embodiment of the present invention, the optoelectronic device further includes a MOS device disposed within the second area.

The present invention further provides a method of forming an optoelectronic device. First, a substrate having a first area is provided. Then, a half-boat-shaped material layer is formed within the first area, wherein the refractive index of the half-boat-shaped material layer is lower than that of the substrate, and a top surface of the half-boat-shaped material layer is coplanar with the surface of the substrate. Thereafter, a deep trench isolation structure is formed in the substrate within the first area, wherein the deep trench isolation structure is formed at one side of a bow portion of the half-boat-shaped material layer. Next, an optical waveguide is formed on the substrate within the first area, wherein the optical waveguide overlaps a portion of the deep trench isolation structure and at least a portion of the half-boat-shaped material layer.

According to an embodiment of the present invention, the step of forming the half-boat-shaped material layer includes performing a plurality of ion implantation processes on the substrate to form a plurality of step-shaped ion implanted regions in the substrate within the first area.

According to an embodiment of the present invention, each of the ion implantation processes includes an $O^+$ ion implantation process.

According to an embodiment of the present invention, the implantation dosage of each of the ion implantation processes is $10^{14}$-$10^{21}$ atoms per cubic centimeter.

According to an embodiment of the present invention, the step of forming the half-boat-shaped material layer further includes performing an annealing process to diffuse the ion implanted regions, so as to form the half-boat-shaped material layer.

According to an embodiment of the present invention, the substrate includes a bulk-Si substrate.

According to an embodiment of the present invention, the material of the optical waveguide includes polysilicon, amorphous silicon, or single crystal silicon.

According to an embodiment of the present invention, the depth of the deep trench isolation structure is in micron level.

According to an embodiment of the present invention, the deep trench isolation structure and the half-boat-shaped material layer are kept a distance apart or directly adjacent to each other.

According to an embodiment of the present invention, the substrate further has a second area, and the first area and the second area are separated from each other by a shallow trench isolation structure.

According to an embodiment of the present invention, the method of forming the optoelectronic device further includes forming a MOS device within the second area.

According to an embodiment of the present invention, the gate of the MOS device is simultaneously formed during the step of forming the optical waveguide.

According to an embodiment of the present invention, the MOS device is formed after the optical waveguide is formed.

As described above, in an optoelectronic device provided by the present invention, an optical waveguide, a coupler, and a MOS device are effectively integrated into a single chip so that less surface area is taken and the system is simplified. In addition, in the method of forming an optoelectronic device provided by the present invention, an optical waveguide, a coupler, and a MOS device can be formed on a bulk-Si substrate by using the existing semiconductor equipments. Thereby, a simple, easy and competitive technique is provided.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
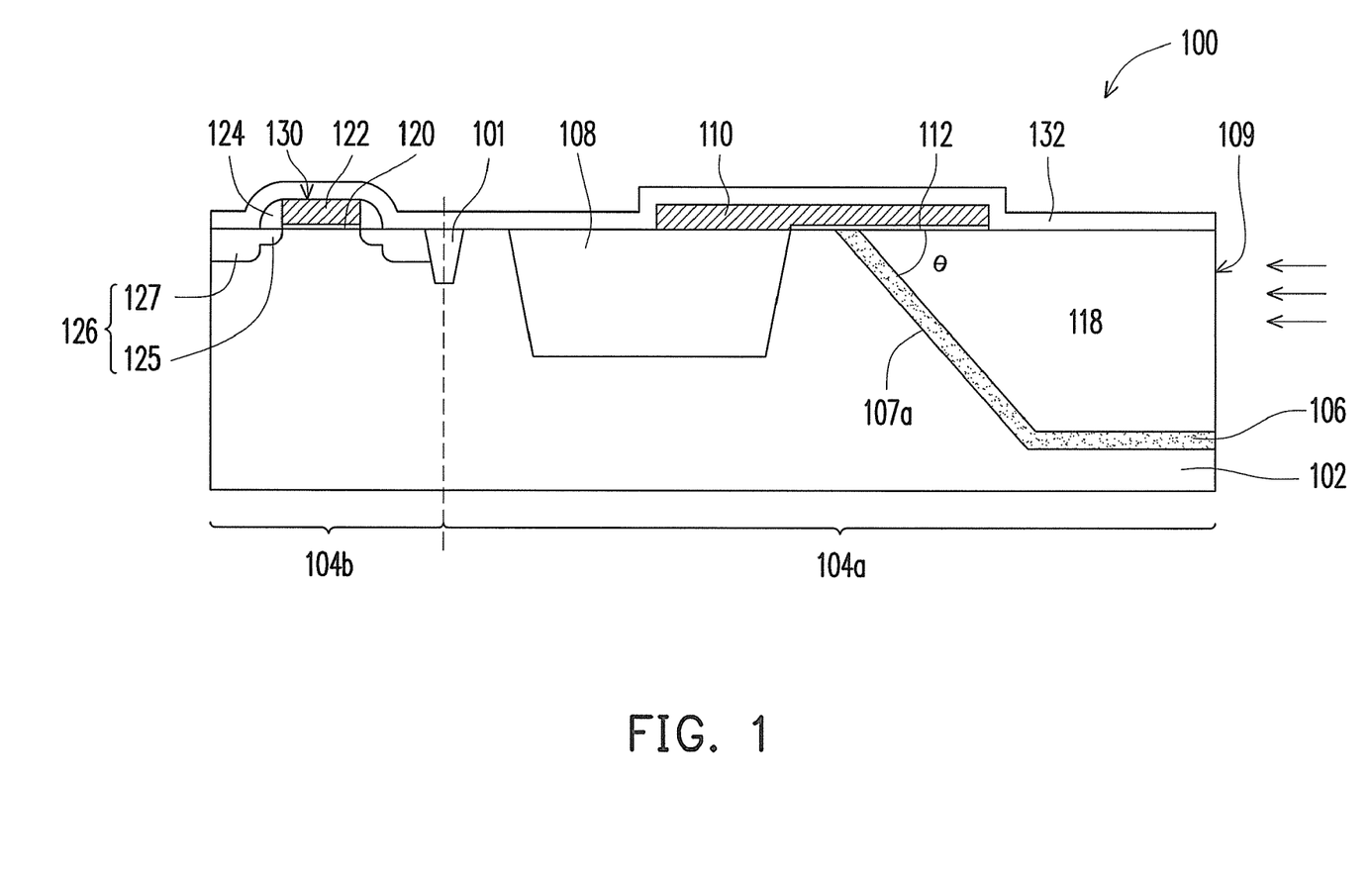
FIG. 1 is a schematic cross-sectional view of an optoelectronic device according to an embodiment of the present invention.

FIG. 1 is a schematic cross-sectional view of an optoelectronic device according to an embodiment of the present invention.

Referring to FIG. 1, the optoelectronic device 100 includes a substrate 102, a half-boat-shaped material layer 106, a deep trench isolation structure 108, and an optical waveguide 110. The substrate 102 may be a bulk-Si substrate and has a first area 104a and a second area 104b. The first area 104a is used for forming optical devices (for example, the optical waveguide 110 and a coupler 118), and the second area 104b is used for forming electronic devices (for example, a metal-oxide-semiconductor (MOS) device 130). The first area 104a and the second area 104b may be separated from each other by a shallow trench isolation structure 101.

Figure 2:
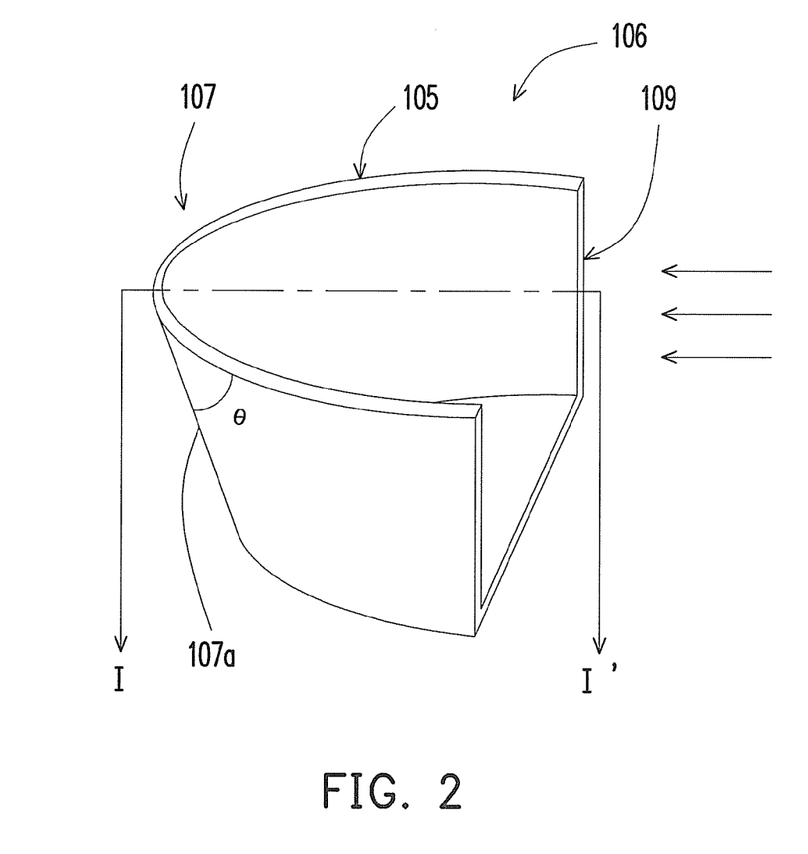
FIG. 2 is a schematic three-dimensional view of a half-boat-shaped material layer according to an embodiment of the present invention.

The half-boat-shaped material layer 106 is disposed in the substrate 102 within the first area 104a. FIG. 2 is a schematic three-dimensional view of the half-boat-shaped material layer 106, wherein the half-boat-shaped material layer 106 in FIG. 1 is illustrated along the cross-section I-I' and accordingly presents a L-shape. The refractive index of the half-boat-shaped material layer 106 is lower than that of the substrate 102. In an embodiment, the material of the half-boat-shaped material layer 106 includes $SiO_x$, and the half-boat-shaped material layer 106 is formed through an $O^+$ ion implantation process. Further, the half-boat-shaped material layer 106 can be formed through another ion implantation process, as long as the refractive index of the half-boat-shaped material layer 106 is lower than that of the substrate 102. For example, the material of the half-boat-shaped material layer 106 includes silicon nitride, and the half-boat-shaped material layer 106 is formed through a nitrogen atom implantation process. Besides, a top surface 105 of the half-boat-shaped material layer 106 is coplanar with the surface of the substrate 102. A bow portion 107 of the half-boat-shaped material layer 106 has an inclined sidewall 107a, and an angle θ formed by the inclined sidewall 107a of the half-boat-shaped material layer 106 and the top surface 105 of the same (or the surface of the substrate 102) is smaller than about 30°. In addition, a laser enters from a stern portion 109 of the half-boat-shaped material layer 106.

Figure 3:
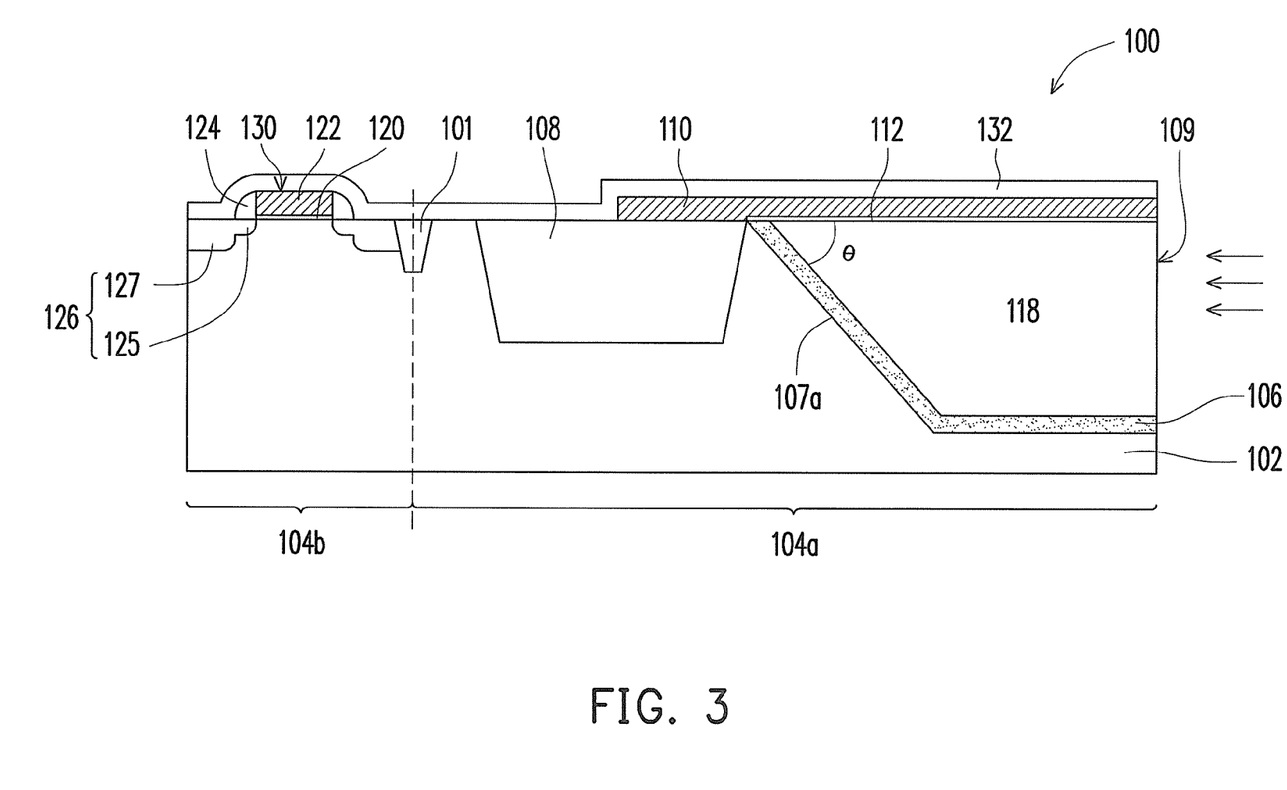
FIG. 3 is a schematic cross-sectional view of an optoelectronic device according to another embodiment of the present invention.

The deep trench isolation structure 108 is disposed in the substrate 102 within the first area 104a and located at one side of the bow portion 107 of the half-boat-shaped material layer 106. The depth of the deep trench isolation structure 108 is in micro level. In an embodiment, the depth of the deep trench isolation structure 108 may be about 2 μm. Besides, the deep trench isolation structure 108 and the half-boat-shaped material layer 106 may be kept a distance apart (as shown in FIG. 1) or directly adjacent to each other (as shown in FIG. 3) according to the design requirement.

The optical waveguide 110 is disposed on the substrate 102 within the first area 104a and overlaps a portion of the deep trench isolation structure 108 and at least a portion of the half-boat-shaped material layer 106. In an embodiment, the optical waveguide 110 overlaps a portion of the half-boat-shaped material layer 106, as shown in FIG. 1. In another embodiment, the optical waveguide 110 overlaps the entire half-boat-shaped material layer 106, as shown in FIG. 3. The material of the optical waveguide 110 includes polysilicon, amorphous silicon, or single crystal silicon. In an embodiment, an insulation layer 112 may be disposed between the optical waveguide 110 and the substrate 102, wherein the material of the insulation layer 112 may be silicon oxide.

Additionally, the optoelectronic device 100 further includes a MOS device 130 disposed within the second area 104b. The MOS device 130 includes an insulation layer 120, a gate 122, a spacer 124, and source/drain regions 126. The gate 122 is disposed on the substrate 102. The insulation layer 120 is disposed between the gate 122 and the substrate 102. The spacer 124 is disposed on a sidewall of the gate 122. Each of the source/drain region 126 includes a lightly doped region 125 and a heavily doped region 127, and the source/drain regions 126 are disposed in the substrate 102 beside the spacer 124. It is for sure that in the second area 104b, the MOS device 130 may further include a metal silicide layer and an interconnection structure thereon such as a contact hole, a via, an interlayer dielectric layer, and a metal layer, etc. These elements are well known to those having ordinary knowledge in the art therefore will not be described herein.

The optoelectronic device 100 further includes a dielectric layer 132. The dielectric layer 132 is disposed on the substrate 102 and covers the optical waveguide 110 and the MOS device 130. The material of the dielectric layer 132 may be silicon oxide or silicon nitride.

It should be noted that because the material of the dielectric layer 132 is silicon oxide and the material of the half-boat-shaped material layer 106 is $SiO_x$, the refractive indexes of the dielectric layer 132 and the half-boat-shaped material layer 106 are both lower than the refractive index of the substrate 102. Accordingly, after the laser enters from the stern portion 109 of the half-boat-shaped material layer 106, the laser is totally internally reflected by the dielectric layer 132 and the half-boat-shaped material layer 106 and then enters the optical waveguide 110. Namely, the dielectric layer 132, the half-boat-shaped material layer 106, and the substrate 102 therebetween form a coupler 118 such that light can be effectively focused and led into the optical waveguide 110. Herein even though the insulation layer 112 is disposed between the optical waveguide 110 and the substrate 102, the path of the laser entering the optical waveguide 110 won't be changed because the insulation layer 112 is very thin (less than 100 Å).

Figure 4:
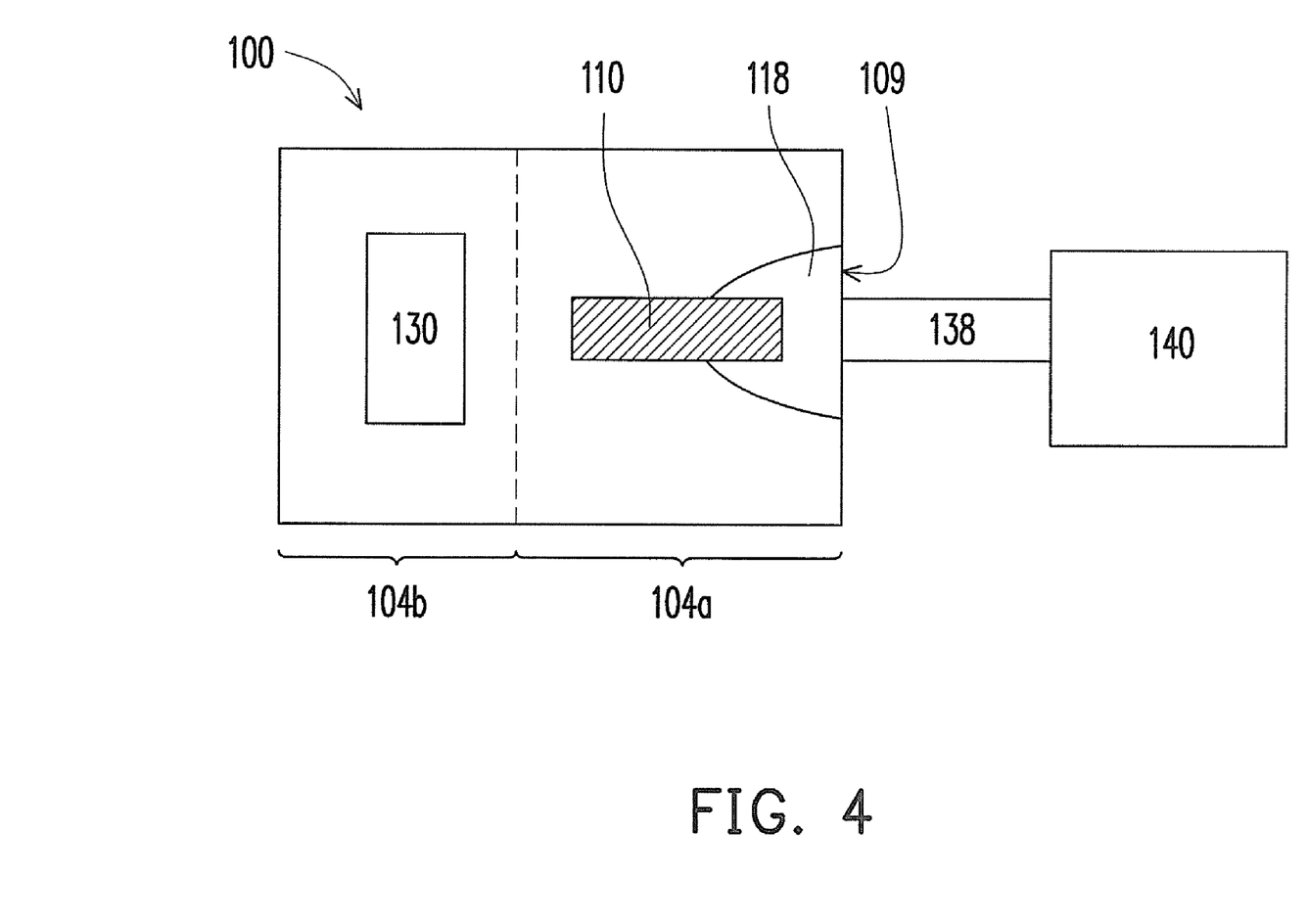
FIG. 4 is a simplified schematic top view illustrating a packaging of an optoelectronic device according to an embodiment of the present invention.

After the optical waveguide 110 and the coupler 118 within the first area 104a and the MOS device 130 within the second area 104b are formed in a single chip, a laser 140 is coupled to the stern portion 109 of the half-boat-shaped material layer 106 through an optical fiber 138 by performing a packaging process, so as to complete the packaging of the optoelectronic device 100. FIG. 4 is a simplified schematic top view illustrating the packaging of the optoelectronic device 100.

In the embodiment described above, a MOS device is formed within the second area. However, the present invention is not limited thereto. It should be understood by those having ordinary knowledge in the art that other electronic devices (for example, resistors, capacitors, or field-effect transistors (FETs), etc) may also be formed within the second area.

Below, a method of forming an optoelectronic device provided by the present invention will be described. FIGS. 5A-5D are schematic cross-sectional views illustrating the method of forming an optoelectronic device according to a first embodiment of the present invention.

Figure 5A:
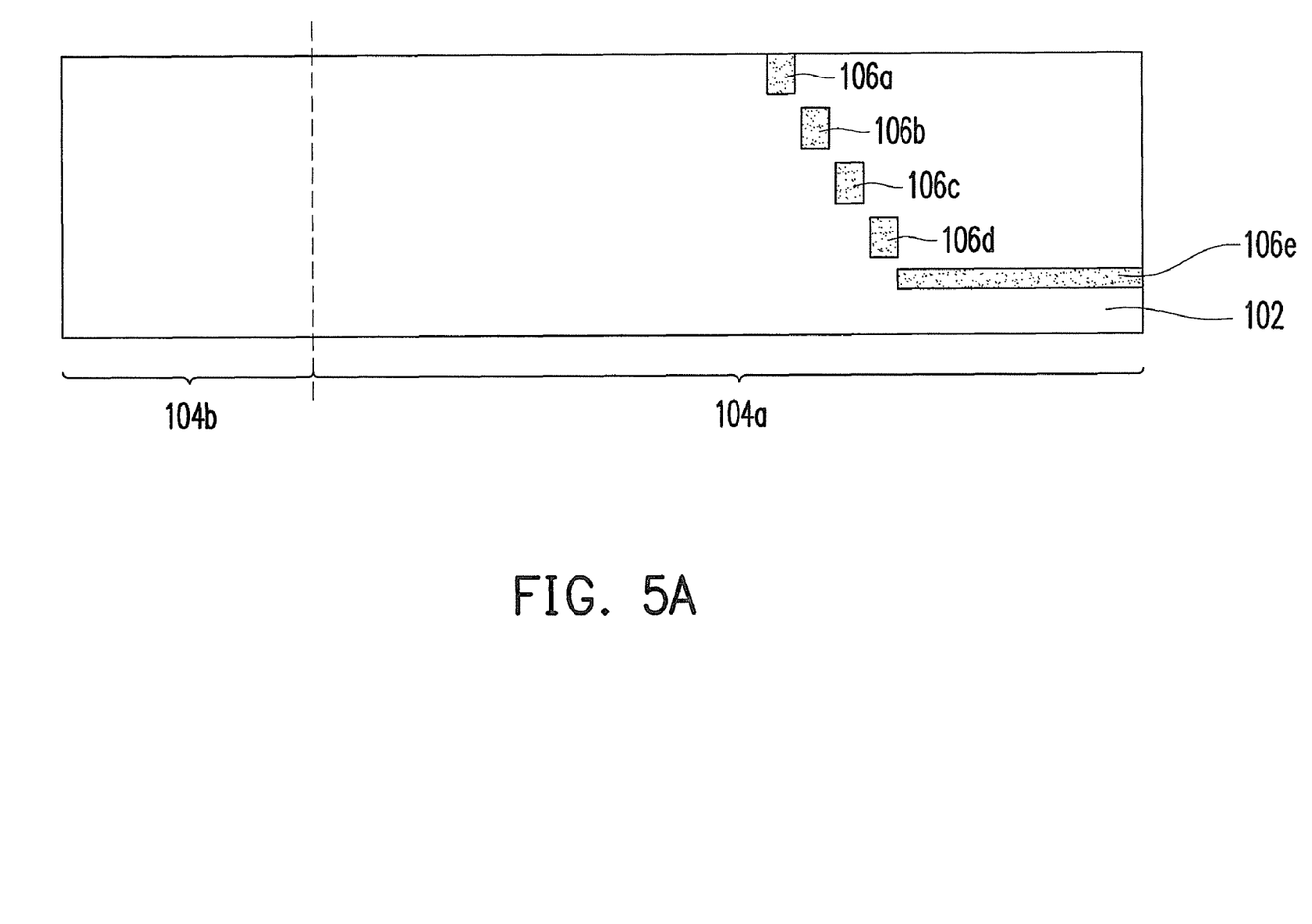
FIGS. 5A-5D are schematic cross-sectional views illustrating a method of forming an optoelectronic device according to a first embodiment of the present invention.
Figure 6:
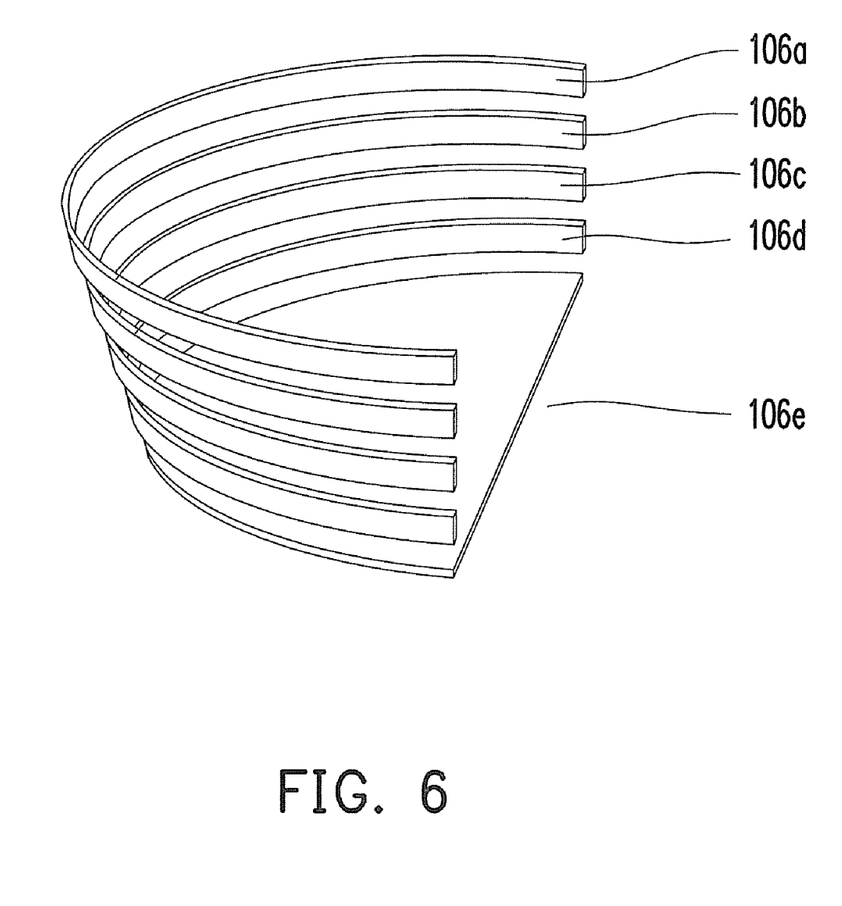
FIG. 6 is a schematic three-dimensional view illustrating ion implanted regions for forming a half-boat-shaped material layer according to an embodiment of the present invention.

First, referring to FIG. 5A, a substrate 102 is provided. The substrate 102 may be a bulk-Si substrate and has a first area 104a and a second area 104b, wherein the first area 104a is used for forming optical devices, such as an optical waveguide 110 and a coupler 118, and the second area 104b is used for forming electronic devices, such as a MOS device 130. Then, a plurality of ion implantation processes is performed on the substrate 102 to form a plurality of step-shaped ion implanted regions 106a to 106e in the substrate 102 within the first area 104a. FIG. 6 is a schematic three-dimensional view of the ion implanted regions 106a to 106e, wherein the ion implanted regions 106a to 106d each present a ring shape so as to form the top and side surfaces of a half-boat-shaped material layer 106, and the ion implanted region 106e presents a sheet-like shape so as to form the bottom surface of the half-boat-shaped material layer 106. In an embodiment, each of the ion implantation processes may be an $O^+$ ion implantation process. The implantation dosage of an $O^+$ ion implantation process may be about $10^{14}$-$10^{21}$ atoms per cubic centimeter, and the implantation energy thereof can be adjusted according to the implantation depth.

In the embodiment described above, the ion implanted regions 106a to 106e are separated from each other, and the distance between two of the ion implanted regions 106a to 106e should allow the diffusion areas thereof overlap each other after the ion implanted regions 106a to 106e are annealed. It is for sure that the ion implanted regions 106a to 106e may also be kept directly adjacent to each other. In addition, the number, sequence, dosage, and energy of the ion implantation processes are not limited in the present embodiment and can all be adjusted according to the design requirement. Moreover, the implanted ions are not limited to $O^+$, and it is within the scope of the present invention as long as the refractive index of the annealed half-boat-shaped material layer 106 is lower than the refractive index of the substrate 102. For example, the material of the half-boat-shaped material layer 106 includes silicon nitride, and the half-boat-shaped material layer 106 is formed through a nitrogen atom implantation process.

Figure 5B:
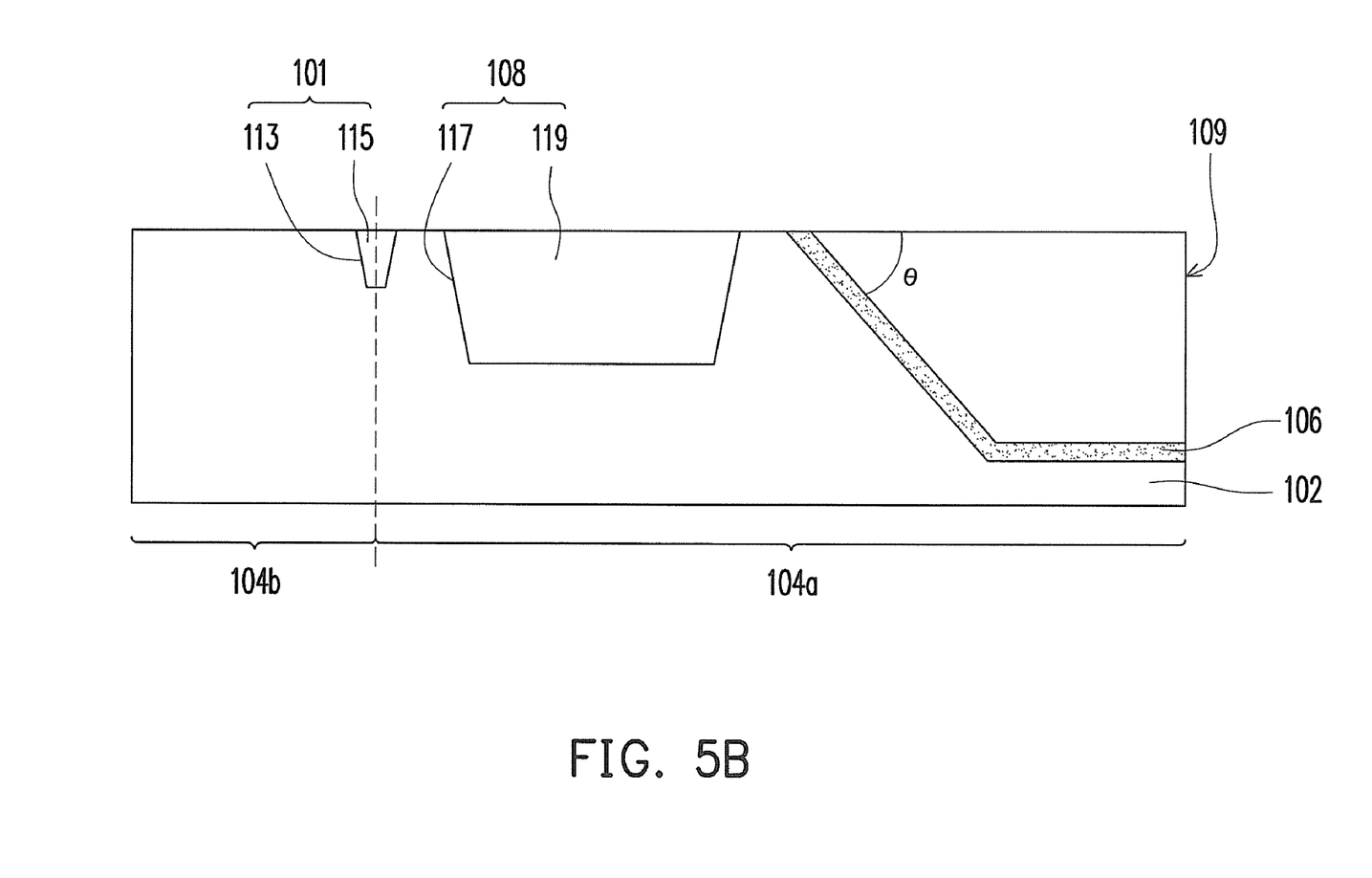

Thereafter, referring to FIG. 5B, an annealing process is optionally performed to diffuse the ion implanted regions 106a to 106e, so as to form the half-boat-shaped material layer 106. The annealing process can be omitted, and the diffusion of the ion implanted regions 106a to 106e can be completed through the subsequent high-temperature process when the shallow trench isolation structure 101 and the deep trench isolation structure 108 are formed. FIG. 2 is a schematic three-dimensional view of the half-boat-shaped material layer 106. The material of the half-boat-shaped material layer 106 may be $SiO_x$. Besides, a top surface 105 of the half-boat-shaped material layer 106 is coplanar with the surface of the substrate 102. A bow portion 107 of the half-boat-shaped material layer 106 has an inclined sidewall 107a, and the angle θ formed by the inclined sidewall 107a of the half-boat-shaped material layer 106 and the top surface 105 of the same (or the surface of the substrate 102) is smaller than about 30°.

Next, at least one shallow trench isolation structure 101 is formed in the substrate 102. The first area 104a and the second area 104b may be separated by the shallow trench isolation structure 101. The shallow trench isolation structure 101 may be formed through following steps. First, a mask layer (not shown) and a patterned photoresist layer (not shown) are sequentially formed on the substrate 102. Then, a portion of the mask layer is removed by using the patterned photoresist layer as a mask, so as to form patterned mask layer. After that, a portion of the substrate 102 is removed by using the patterned mask layer as a mask, so as to form a shallow trench 113. Next, an isolation layer 115 is filled in the shallow trench 113 to form a shallow trench isolation structure 101. After that, the patterned mask layer is removed.

Thereafter, a deep trench isolation structure 108 is formed in the substrate 102 within the first area 104a, and the deep trench isolation structure 108 is formed at one side of the bow portion 107 of the half-boat-shaped material layer 106. The deep trench isolation structure 108 is formed through following steps. First, a mask layer (not shown) and a patterned photoresist layer (not shown) are sequentially formed on the substrate 102. Then, a portion of the mask layer is removed by using the patterned photoresist layer as a mask, so as to form a patterned mask layer. Next, a portion of the substrate 102 is removed by using the patterned mask layer as a mask, so as to form a deep trench 117. After that, an isolation layer 119 is filled in the deep trench 117 to form the deep trench isolation structure 108. Next, the patterned mask layer is removed. The depth of the deep trench isolation structure 108 is in micron level. In an embodiment, the depth of the deep trench isolation structure 108 may be about 2 μm. In the present embodiment, the deep trench isolation structure 108 and the half-boat-shaped material layer 106 are kept a distance apart.

However, the present invention is not limited thereto, and in another embodiment, the deep trench isolation structure 108 and the half-boat-shaped material layer 106 may also be designed directly adjacent to each other, as shown in FIG. 3.

The sequence of forming the shallow trench isolation structure 101, the deep trench isolation structure 108 and the half-boat-shaped material layer 106 can be adjusted upon the process requirements. For example, the shallow trench isolation structure 101 and the deep trench isolation structure 108 are formed before forming the half-boat-shaped material layer 106. Further, the sequence of forming the shallow trench isolation structure 101 and the deep trench isolation structure 108 can be adjusted as needed. Besides, the annealing process of the half-boat-shaped material layer 106 can be performed before forming the shallow trench isolation structure 101 and the deep trench isolation structure 108. Alternatively, the annealing process can be omitted, and the diffusion of the ion implanted regions 106a to 106e can be completed through the subsequent process when the well region and the source/drain regions are annealed.

Figure 5C:
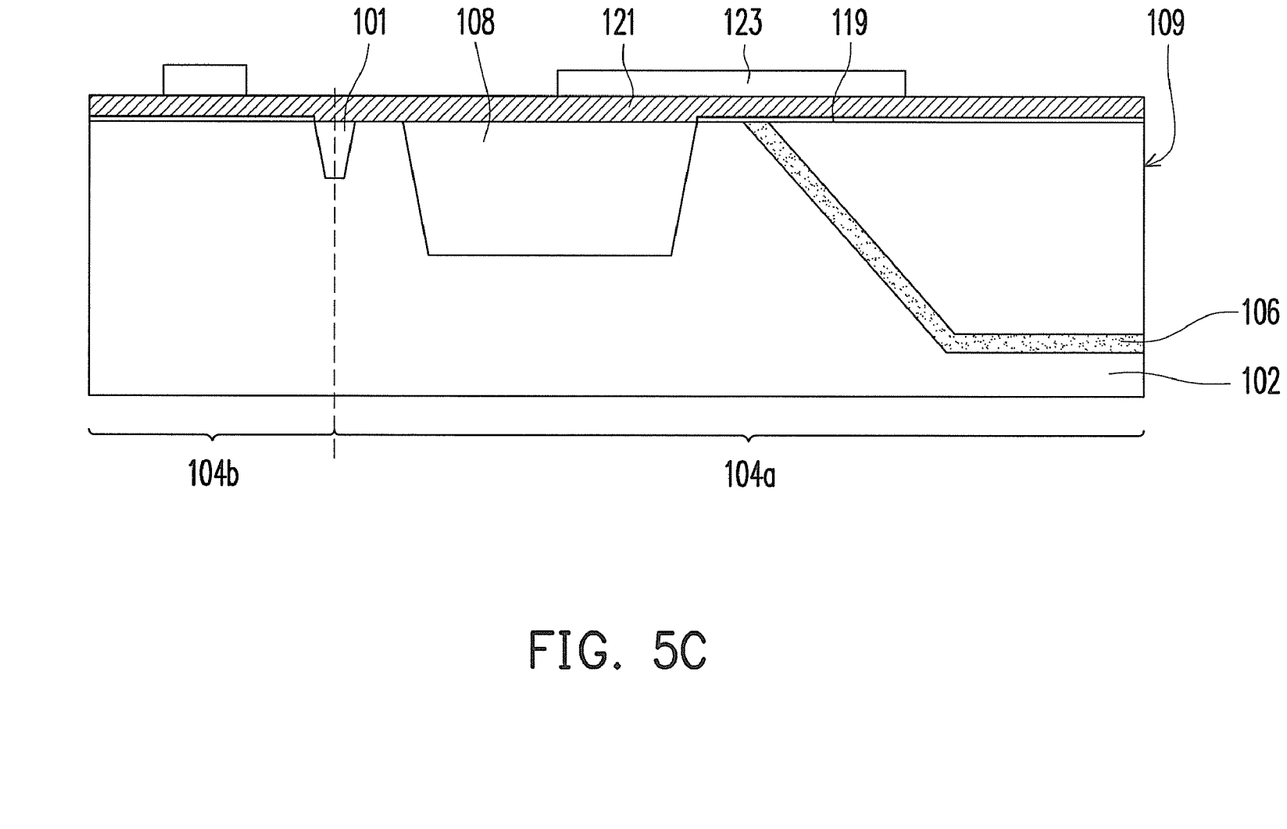

Next, referring to FIG. 5C, an insulation material layer 119, a conductive layer 121, and a patterned photoresist layer 123 are sequentially formed on the substrate 102. The material of the insulation material layer 119 may be silicon oxide, and the insulation material layer 119 may be formed through thermal oxidation or a patterning method by using a mask. The material of the conductive layer 121 may be polysilicon, and the conductive layer 121 may be formed through chemical vapour deposition (CVD).

Figure 5D:
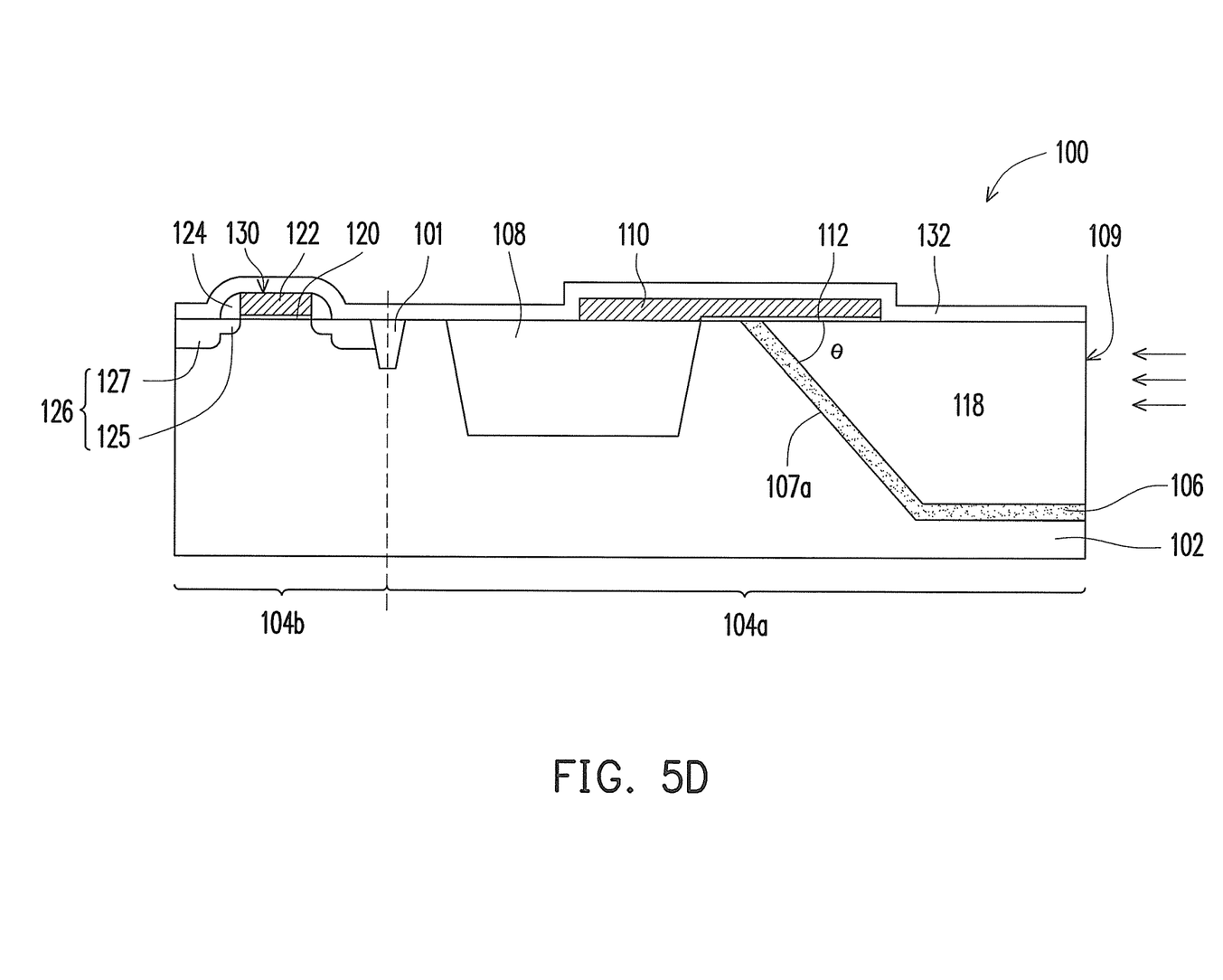

Next, referring to FIG. 5D, the conductive layer 121 and the insulation material layer 119 are sequentially etched by using the patterned photoresist layer 123 as a mask, so as to form an insulation layer 112 and an optical waveguide 110 on the substrate 102 within the first area 104a and an insulation layer 120 and a gate 122 on the substrate 102 within the second area 104b. The optical waveguide 110 overlaps a portion of the deep trench isolation structure 108 and at least a portion of the half-boat-shaped material layer 106. In the present embodiment, the optical waveguide 110 overlaps a portion of the half-boat-shaped material layer 106. However, the present invention is not limited thereto, and in another embodiment, the optical waveguide 110 may also overlap the entire half-boat-shaped material layer 106, as shown in FIG. 3. Thereafter, the patterned photoresist layer 123 is removed and the fabrication of the optical waveguide 110 and the coupler 118 within the first area 104a is completed.

After that, referring to FIG. 5D again, the process is continued to complete the fabrication of the MOS device 130 within the second area 104b. Lightly doped region 125 are formed in the substrate 102 beside the gate 122. A spacer 124 is formed on a sidewall of the gate 122. Heavily doped regions 127 are formed in the substrate 102 beside the spacer 124. An annealing process is performed to the doped regions to activate the dopants therein. The lightly doped regions 125 and the heavily doped regions 127 form source/drain regions 126. A dielectric layer 132 is formed on the substrate 102 to cover the MOS device 130 and the optical waveguide 110. The spacer 124, the source/drain regions 126, the dielectric layer 132, and other elements that are not shown here (for example, the metal silicide layer, the contact hole, the via, the interlayer dielectric layer, and the metal layer, etc) are all well known to those having ordinary knowledge in the art and accordingly the materials and formation techniques thereof will not be described herein. By now, the optoelectronic device 100 in the present invention is completed, wherein the first area 104a contains the optical waveguide 110 and the coupler 118, the second area 104b contains the MOS device 130, and a laser enters the optical waveguide 110 through the coupler 118 to carry out subsequent processes.

Figure 7A:
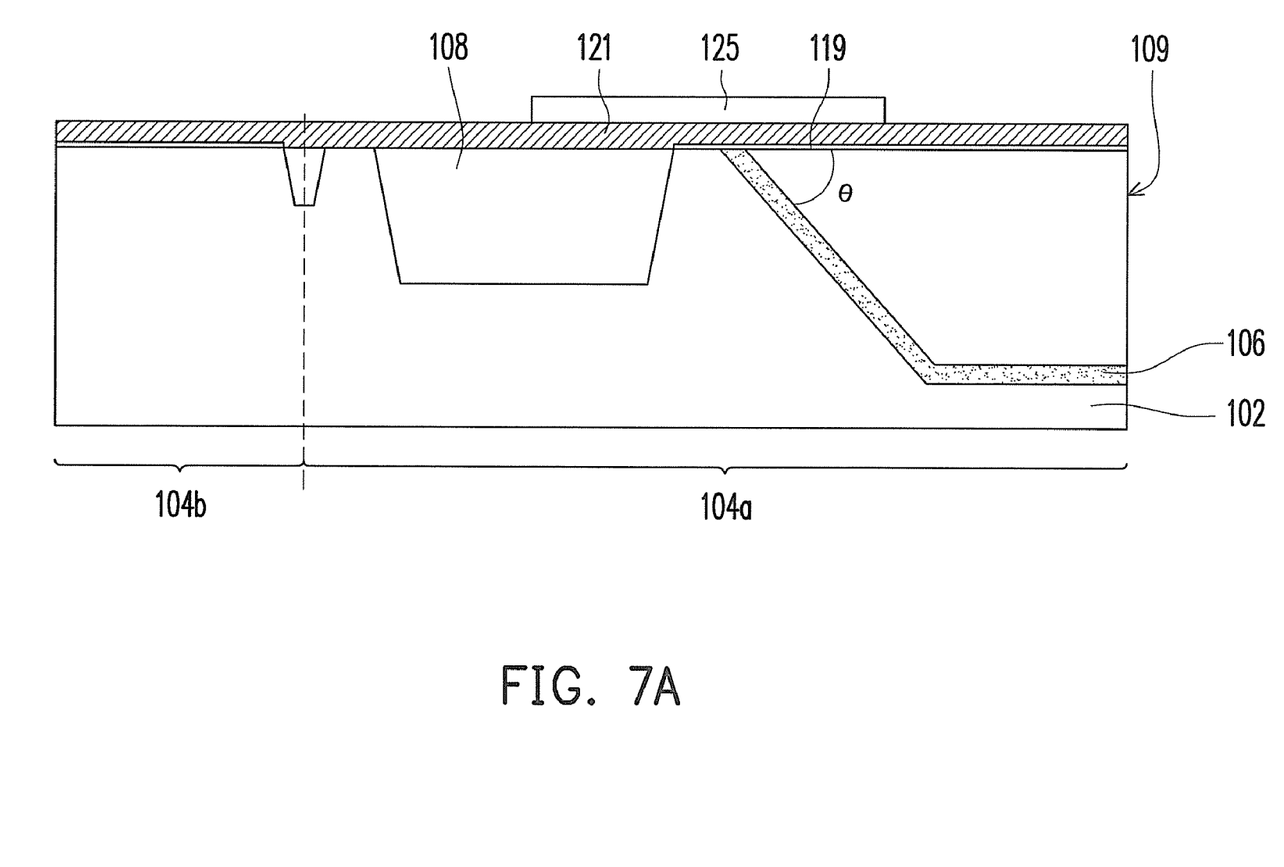
FIGS. 7A-7C are schematic cross-sectional views illustrating a method of forming an optoelectronic device according to a second embodiment of the present invention.
Figure 7B:
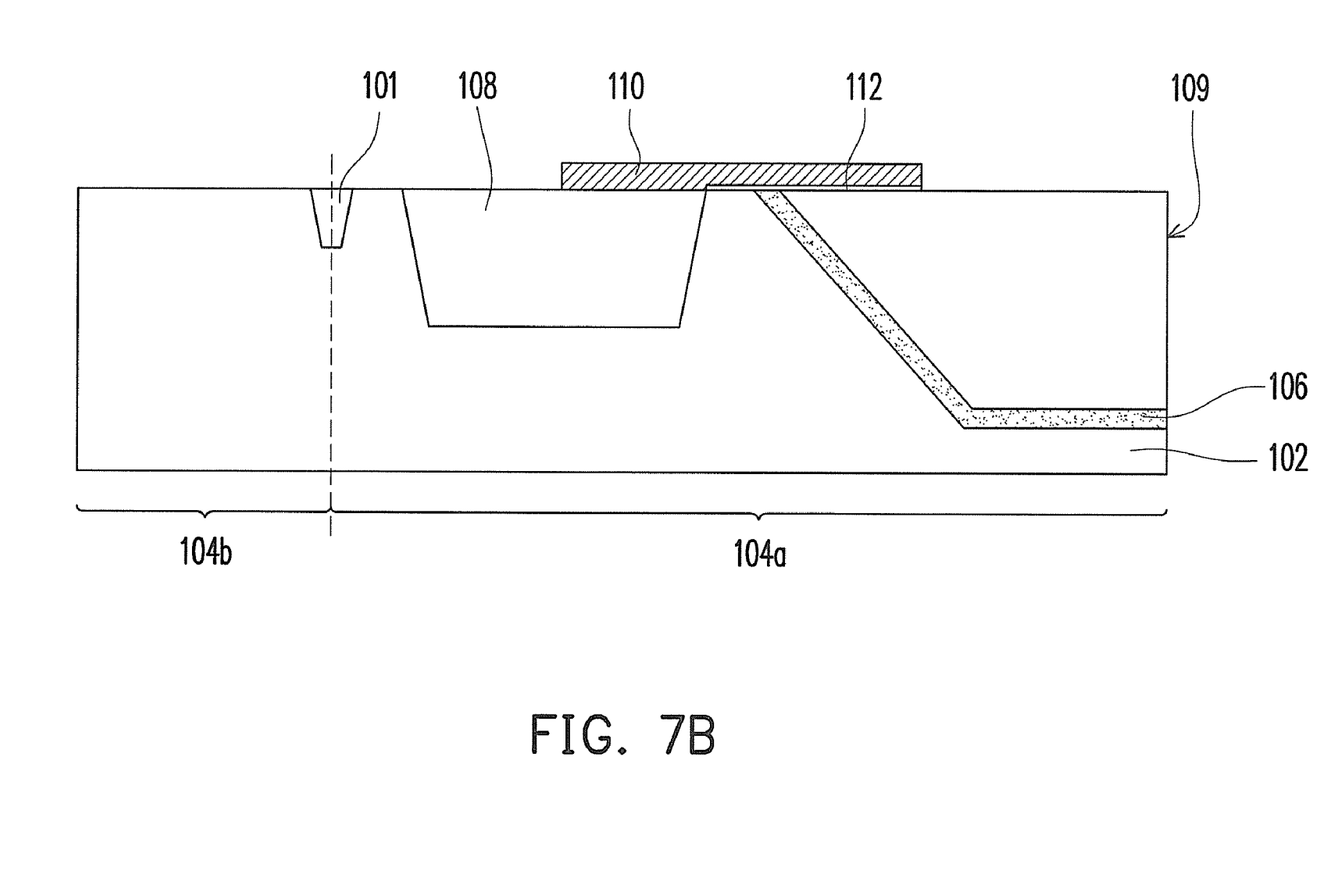
Figure 7C:
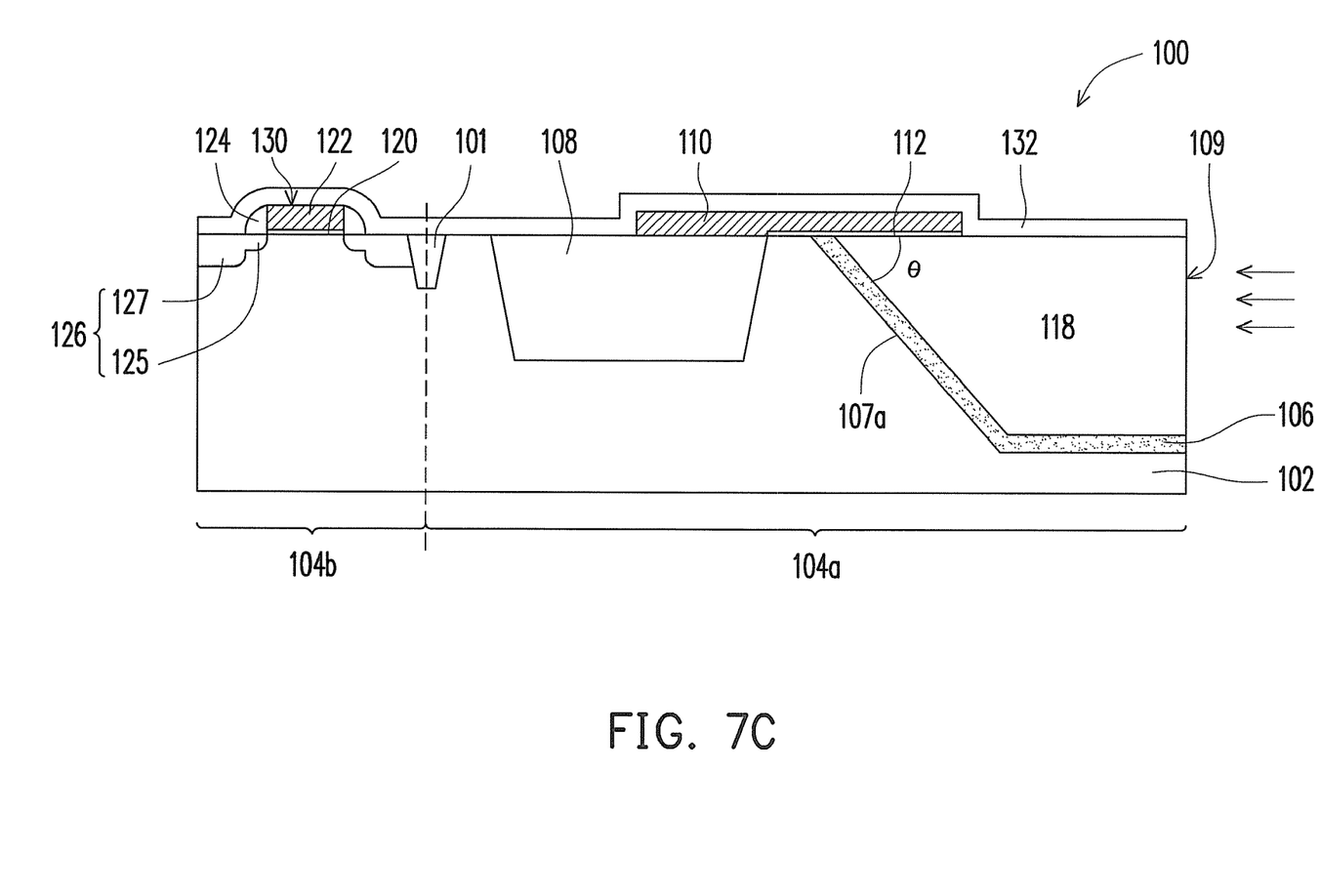

In the first embodiment, the gate 120 of the MOS device 130 is formed simultaneously when the optical waveguide 110 is formed. However, the present invention is not limited thereto, and the MOS device 130 may also be formed after the optical waveguide 110 is formed, as described in the second embodiment. Below, the difference between the first embodiment and the second embodiment will be described, and the similarity are not iterated herein. FIGS. 7A-7C are schematic cross-sectional views illustrating a method of forming an optoelectronic device according to a second embodiment of the present invention.

First, an intermediate structure as shown in FIG. 5B is provided. Then, referring to FIG. 7A, an insulation material layer 119, an conductive layer 121, and a patterned photoresist layer 125 are sequentially formed on the substrate 102. The material of the insulation material layer 119 may be silicon oxide, and the insulation material layer 119 may be formed through thermal oxidation. The material of the conductive layer 121 may be polysilicon, amorphous silicon, or single crystal silicon, and the conductive layer 121 may be formed through CVD.

Next, referring to FIG. 7B, the conductive layer 121 and the insulation material layer 119 are sequentially etched by using the patterned photoresist layer 125 as a mask, so as to form the insulation layer 112 and the optical waveguide 110 on the substrate 102 within the first area 104a. The optical waveguide 110 overlaps a portion of the deep trench isolation structure 108 and at least a portion of the half-boat-shaped material layer 106. Finally, the patterned photoresist layer 125 is removed so that the fabrication of the optical waveguide 110 and the coupler 118 within the first area 104b is completed.

Thereafter, referring to FIG. 7C, the MOS device 130 is formed within the second area 104b. An insulation layer 120 and a gate 122 are sequentially formed on the substrate 102. Lightly doped region 125 are formed in the substrate 102 beside the gate 122. A spacer 124 is formed on a sidewall of the gate 122. Heavily doped region 127 are formed in the substrate 102 beside the spacer 124. The lightly doped regions 125 and the heavily doped regions 127 form source/drain regions 126. A dielectric layer 132 is formed on the substrate 102 to cover the MOS device 130 and the optical waveguide 110. By now, the optoelectronic device 100 in the present invention is completed.

As described above, in an optoelectronic device provided by the present invention, an optical waveguide, a coupler, and a MOS device are effectively integrated into a single chip so that less surface area is taken and the system is simplified. In addition, in the method of forming an optoelectronic device provided by the present invention, an optical waveguide, a coupler, and a MOS device are formed on a bulk-Si substrate by using the existing semiconductor equipments. Namely, the method of forming an optoelectronic device provided by the present invention can avoid fine tuning the modeling of the MOS device formed on a silicon-on-insulator (SOI) substrate, so that the fabrication cost of the optoelectronic device is greatly reduced and the competitiveness thereof is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optoelectronic device, comprising:
a substrate, having a first area;
a half-boat-shaped material layer, disposed in the substrate within the first area, wherein a refractive index of the half-boat-shaped material layer is lower than a refractive index of the substrate, and a top surface of the half-boat-shaped material layer is coplanar with a surface of the substrate;
a deep trench isolation structure, disposed in the substrate within the first area, and located at one side of a bow portion of the half-boat-shaped material layer; and
an optical waveguide, disposed on the substrate within the first area, and overlapping a portion of the deep trench isolation structure and at least a portion of the half-boat-shaped material layer.

2. The optoelectronic device according to claim 1, wherein the substrate comprises a bulk-Si substrate.

3. The optoelectronic device according to claim 1, wherein a material of the half-boat-shaped material layer comprises $SiO_x$.

4. The optoelectronic device according to claim 1, wherein a material of the optical waveguide comprises polysilicon, amorphous silicon, or single crystal silicon.

5. The optoelectronic device according to claim 1, wherein a depth of the deep trench isolation structure is in micron level.

6. The optoelectronic device according to claim 1, wherein the deep trench isolation structure and the half-boat-shaped material layer are kept a distance apart or directly adjacent to each other.

7. The optoelectronic device according to claim 1, wherein a laser is coupled to a stern portion of the half-boat-shaped material layer through an optical fiber.

8. The optoelectronic device according to claim 1, wherein the substrate further comprises a second area, and the first area and the second area are separated from each other by a shallow trench isolation structure.

9. The optoelectronic device according to claim 8, further comprising a metal-oxide-semiconductor (MOS) device disposed within the second area.

10. A method of forming an optoelectronic device, comprising:
providing a substrate, wherein the substrate has a first area;
forming a half-boat-shaped material layer within the first area, wherein a refractive index of the half-boat-shaped material layer is lower than a refractive index of the substrate, and a top surface of the half-boat-shaped material layer is coplanar with a surface of the substrate;
forming a deep trench isolation structure in the substrate within the first area, wherein the deep trench isolation structure is formed at one side of a bow portion of the half-boat-shaped material layer; and
forming an optical waveguide on the substrate within the first area, wherein the optical waveguide overlaps a portion of the deep trench isolation structure and at least a portion of the half-boat-shaped material layer.

11. The method according to claim 10, wherein the step of forming the half-boat-shaped material layer comprises performing a plurality of ion implantation processes on the substrate to form a plurality of step-shaped ion implanted regions in the substrate within the first area.

12. The method according to claim 11, wherein each of the ion implantation processes comprises an $O^+$ ion implantation process.

13. The method according to claim 11, wherein an implantation dosage of each of the ion implantation processes is about $10^{14}$-$10^{21}$ atoms per cubic centimeter.

14. The method according to claim 11, wherein the step of forming the half-boat-shaped material layer further comprises performing an annealing process to diffuse the ion implanted regions, so as to form the half-boat-shaped material layer.

15. The method according to claim 10, wherein the substrate comprises a bulk-Si substrate.

16. The method according to claim 10, wherein a material of the optical waveguide comprises polysilicon, amorphous silicon, or single crystal silicon.

17. The method according to claim 10, wherein a depth of the deep trench isolation structure is in micron level.

18. The method according to claim 10, wherein the deep trench isolation structure and the half-boat-shaped material layer are kept a distance apart or directly adjacent to each other.

19. The method according to claim 10, wherein the substrate further comprises a second area, and the first area and the second area are separated from each other by a shallow trench isolation structure.

20. The method according to claim 19, further comprising forming a MOS device within the second area.

21. The method according to claim 20, wherein a gate of the MOS device is simultaneously formed during the step of forming the optical waveguide.

22. The method according to claim 20, wherein the MOS device is formed after the optical waveguide is formed.

* * * * *